US010006632B2

(12) United States Patent
Ajhar et al.

(10) Patent No.: US 10,006,632 B2
(45) Date of Patent: Jun. 26, 2018

(54) METHODS AND APPARATUS FOR OXIDATION OF UNBURNTS

(71) Applicant: ALSTOM Technology Ltd, Baden (CH)

(72) Inventors: Marc Ajhar, Wiesbaden (DE); Jörgen Grubbström, Vaxjö (SE); Corinne Beal, Voisins le Bretonneux (FR)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 755 days.

(21) Appl. No.: 14/478,587

(22) Filed: Sep. 5, 2014

(65) Prior Publication Data
US 2014/0373764 A1 Dec. 25, 2014

Related U.S. Application Data

(63) Continuation of application No. PCT/IB2013/052451, filed on Mar. 27, 2013.

(30) Foreign Application Priority Data

Mar. 30, 2012 (EP) ..................................... 12162490

(51) Int. Cl.
*F23J 15/00* (2006.01)
*F23C 10/00* (2006.01)
(Continued)

(52) U.S. Cl.
CPC ................ *F23J 15/00* (2013.01); *B01J 8/26* (2013.01); *C10J 3/725* (2013.01); *F23C 10/005* (2013.01);
(Continued)

(58) Field of Classification Search
CPC .......... F23C 2900/99008; F23C 10/005; F23C 10/01; B01J 8/26; B01J 8/28; B01J 8/30; C10J 3/725
See application file for complete search history.

(56) References Cited

U.S. PATENT DOCUMENTS 5,509,362 A 4/1996 Lyon
6,494,153 B1 12/2002 Lyon
(Continued)

FOREIGN PATENT DOCUMENTS

CN 101802495 A 8/2010
EP 0 918 192 A1 5/1999
(Continued)

OTHER PUBLICATIONS

Unofficial English Translation of Japanese Search Report issued in connection with corresponding JP Application No. 2015-502530 dated Oct. 25, 2016.
(Continued)

*Primary Examiner* — David J Laux
(74) *Attorney, Agent, or Firm* — GE Global Patent Operation; Stephen G. Midgley

(57) ABSTRACT

A method and apparatus for treatment of unburnts utilizing oxygen carrier particles, which may be CLOU particles, oxidized in an air reactor and transmitted to a post oxidation reactor as shown in FIG. 2. A flue gas stream containing unburnts is injected into post oxidation reactor wherein unburnts are oxidized by oxygen supplied by oxygen carriers. Reduced oxygen carriers are separated from post oxidation reactor and transmitted back to air reactor for re-oxidation. An embodiment may include a post oxidation chamber, which may be catalytic, receiving a portion of flue gas stream and oxygen from a flue gas stream of post oxidation reactor.

19 Claims, 3 Drawing Sheets

(51) Int. Cl.

| | | |
|---|---|---|
| *C10J 3/72* | (2006.01) | |
| *B01J 8/26* | (2006.01) | |
| *F23C 10/18* | (2006.01) | |
| *F23L 7/00* | (2006.01) | |
| *F23C 99/00* | (2006.01) | |
| *F23C 13/00* | (2006.01) | |
| *F23G 7/06* | (2006.01) | |
| *F23G 7/07* | (2006.01) | |

(52) U.S. Cl.
CPC .............. *F23C 10/18* (2013.01); *F23C 13/00* (2013.01); *F23C 99/00* (2013.01); *F23G 7/06* (2013.01); *F23G 7/07* (2013.01); *F23L 7/007* (2013.01); *F23C 2900/99008* (2013.01); *Y02E 20/12* (2013.01); *Y02E 20/344* (2013.01); *Y02E 20/346* (2013.01)

(56) References Cited

U.S. PATENT DOCUMENTS

| | | | | |
|---|---|---|---|---|
| 7,820,139 | B2* | 10/2010 | Morin | .................. C10J 3/56 |
| | | | | 423/650 |
| 8,110,012 | B2* | 2/2012 | Chiu | .................. C10J 3/54 |
| | | | | 252/373 |
| 8,318,101 | B2 | 11/2012 | Morin et al. | |
| 8,486,361 | B2 | 7/2013 | Bialkowski et al. | |
| 9,566,546 | B2* | 2/2017 | Hoteit | .................. F23C 10/10 |
| 2008/0193349 | A1 | 8/2008 | Morin | |
| 2011/0048296 | A1 | 3/2011 | Maghdissian et al. | |
| 2011/0129408 | A1 | 6/2011 | Jadhav | |
| 2011/0132737 | A1* | 6/2011 | Jadhav | .................. C01B 31/20 |
| | | | | 201/28 |
| 2011/0174203 | A1 | 7/2011 | Salatino et al. | |
| 2011/0198861 | A1 | 8/2011 | Jallais et al. | |
| 2011/0223083 | A1* | 9/2011 | Bialkowski | .......... B01D 53/864 |
| | | | | 423/220 |

FOREIGN PATENT DOCUMENTS

| | | |
|---|---|---|
| FR | 2 960 943 A1 | 12/2011 |
| JP | H11209117 A | 8/1999 |
| JP | 2009521588 A | 6/2009 |
| JP | 2011521197 A | 7/2011 |
| JP | 2012506022 A | 3/2012 |
| JP | 2013522149 A | 6/2013 |
| WO | 2005/124232 A1 | 12/2005 |
| WO | 2011110915 A1 | 9/2011 |

OTHER PUBLICATIONS

Unofficial English Translation of Japanese Office Action issued in connection with corresponding JP Application No. 2015-502530 dated Nov. 1, 2016.

Unofficial translation of Notice of Allowance issued in connection with corresponding JP Application No. 2015-502530 dated May 9, 2017.

* cited by examiner

METHODS AND APPARATUS FOR OXIDATION OF UNBURNTS

CROSS-REFERENCE TO RELATED APPLICATION

This application claims priority of International Application No. PCT/IB2013/052451, filed on Mar. 27, 2013, which in turn claims priority to EP Application No. 12162490.2, filed on Mar. 30, 2012, both of which are hereby incorporated in their entireties.

FIELD

The present disclosure relates to oxidation of unburnts. More particularly, it relates to an efficient method and apparatus to oxidize unburnts while reducing energy consumption and capital costs.

BACKGROUND

Certain processes, such as combustion of carbon containing fuels, produce gaseous emissions of carbon dioxide ($CO_2$). $CO_2$ has been identified as a "greenhouse" gas, which appears to contribute to global warming. Because of its status as a "greenhouse" gas, technologies have been developed to prevent large quantities of $CO_2$ from being released into the atmosphere from the use of fossil fuels.

Chemical looping combustion (CLC) is a combustion technology that provides efficient $CO_2$ capture and processing. CLC provides for inherent separation of $CO_2$ produced during oxidation of carbon containing fuels thereby creating a more concentrated stream of $CO_2$. By increasing the concentration of $CO_2$ as part of the combustion technology, the energy and capital expenditures required to separate $CO_2$ after combustion for capture and storage are substantially reduced.

CLC technology generally involves use of an oxygen carrier, which transfers oxygen from air to a fuel, thereby avoiding direct contact between air and the fuel. Two inter-connected reactors, typically fluidized beds, are used in the process: a fuel reactor and an air reactor. The fuel is introduced in the fuel reactor, which further receives the oxygen carrier which is typically a metal oxide. An exit flue gas stream from the fuel reactor primarily contains products from oxidation of the fuel, $H_2O$ and $CO_2$, and reduced oxygen carriers. A stream consisting of a high concentration of $CO_2$ may then be obtained by condensing $H_2O$ contained in the flue gas stream of the fuel reactor after reduced oxygen carriers are removed from the exit flue gas stream.

A reduced oxygen carrier formed as part of fuel oxidation reaction, is transferred to the air reactor where it is re-oxidized in the presence of air. A flue gas stream exiting the air reactor consists primarily of non-reactive components of air, such as nitrogen, oxidized oxygen carriers and unused oxygen. Oxidized oxygen carriers may be separated from the flue gas stream of the air rector for transmission to the fuel reactor. Through the use of oxygen carriers to deliver oxygen to the fuel reactor, the non-reactive components of air are expelled from the system as they exit the air reactor and are never introduced into the fuel reactor. Therefore, the products of combustion, primarily $CO_2$ and $H_2O$, are not diluted by non-reactive components of air in the flue gas stream of the fuel reactor.

Depending on the conditions and materials used, combustion of the fuel in the fuel reactor may be incomplete. Incomplete combustion may cause unburnts, such as hydrogen, methane, and carbon monoxide, to be present in the flue gas stream of the fuel reactor. In order to reduce or eliminate the unburnts from the flue gas stream, the unburnts are typically oxidized in a post combustion unit after combustion in the fuel reactor. Unburnts may also be present in other flue gas streams from various industrial and/or combustion applications.

One of the difficulties with oxidation of unburnts, such as in CLC systems, is that the post combustion unit requires pure or enriched oxygen gas. If air was added to the post combustion unit for oxidation, the benefits of CLC would be lost because the non-reactive constituents of air would be added to the flue gas stream of the fuel reactor prior to transmitting the flue gas stream to a gas processing unit. This requirement to provide pure or oxygen enriched gas to a post combustion units applies equally to other industrial processes and/or combustion technologies requiring post combustion oxidation in an oxygen enriched environment (e.g. an oxy-fired plant). Accordingly, post combustion oxidation requires the addition of pure or oxygen enriched gas, which is expensive both in terms of energy consumption and capital costs. Moreover, depending on the amount of unburnts requiring oxidation, combustion in pure or enriched oxygen may lead to strongly elevated temperatures, requiring cooling. Accordingly, there is a need for an improved method and apparatus for more efficient treatment of unburnts.

SUMMARY

According to aspects illustrated herein, there is provide a method of oxidizing unburnts in a chemical looping combustion system by injecting a fuel into a fuel reactor of a chemical looping combustion system, injecting oxidized oxygen carriers into the fuel reactor, and oxidizing the fuel with oxygen provided by the oxygen carriers. Solids are removed from a flue gas stream of the fuel reactor. The flue gas stream of the fuel reactor containing unburnts is transmitted to a post oxidation reactor which is injected with oxidized oxygen carriers. Unburnts are oxidized in the post oxidation reactor with oxygen provided by the oxygen carriers. Reduced oxygen carriers are separated from a flue gas stream of the post oxidation reactor and transmitted to an air reactor where they are re-oxidized in the presence of air injected in the air reactor. The oxidized oxygen carriers are separated from a flue gas stream of the air reactor and transmitted to the post oxidation reactor.

According to other aspects illustrated herein, there is provided a method of oxidizing unburnts by transmitting at least a portion of a flue gas stream containing unburnts to a post oxidation reactor. The post oxidation reactor is injected with oxidized oxygen carriers. The unburnts are oxidized in the post oxidation reactor. Oxidized oxygen carriers are reduced in the post oxidation reactor and transmitted to an air reactor for re-oxidation.

According to other aspects illustrated herein, there is provided an apparatus for oxidation of unburnts having a post oxidation reactor, an air reactor connected to the post oxidation reactor, and flue gas stream connected to the post oxidation reactor. Unburnts are present in the flue gas stream which is injected into the post oxidation reactor. Oxidized oxygen carriers are formed in the air reactor and transmitted to the post oxidation reactor. Unburnts are oxidized in the post oxidation reactor by oxygen supplied by the oxygen carriers.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION

Figure 1:
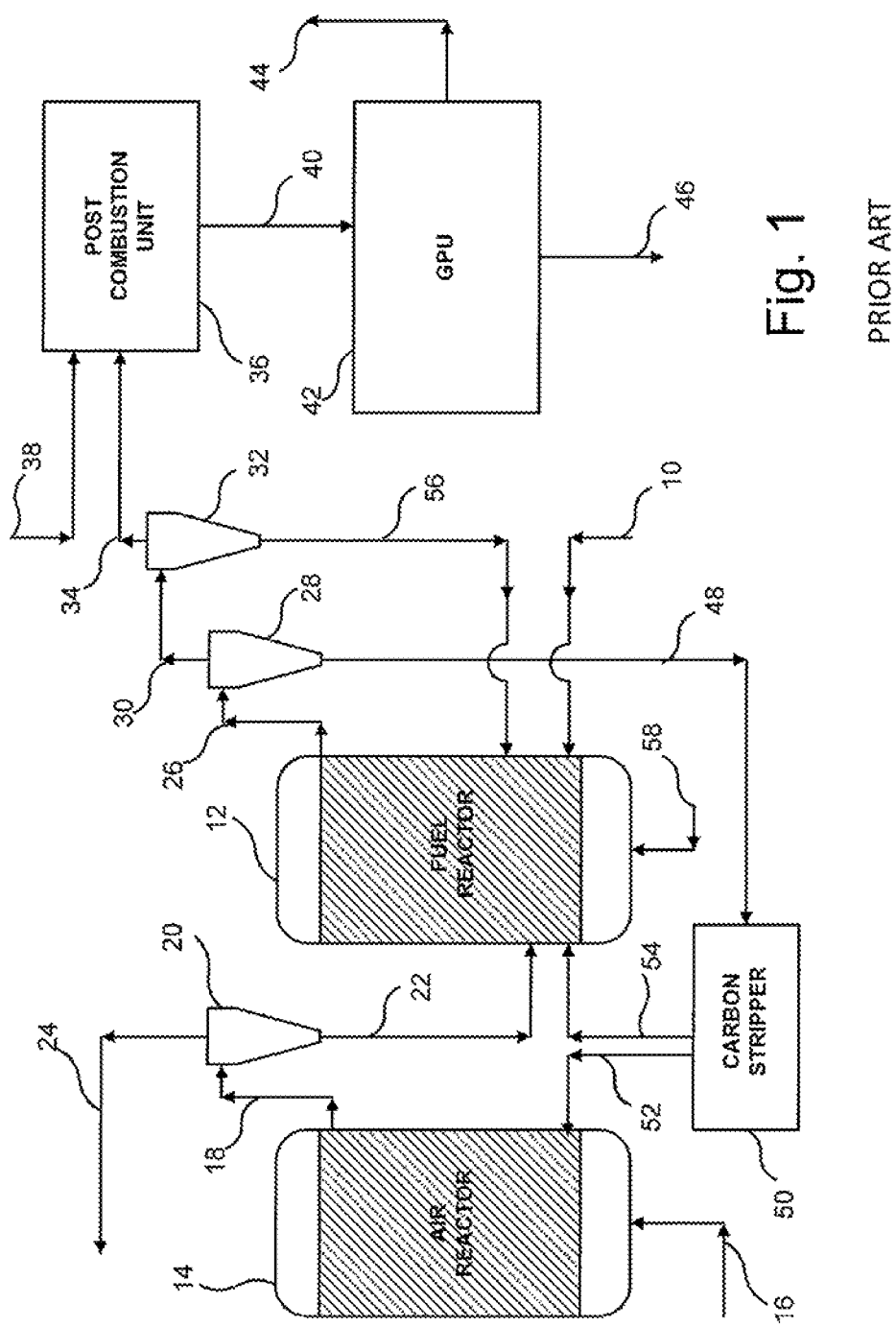
FIG. 1 is an example schematic flow diagram of a prior art chemical looping combustion system.

According to an exemplary embodiment of the present disclosure, an efficient method is provided for oxidizing unburnts in a chemical looping combustion (CLC) system. A method is provided that reduces energy requirements of oxidation of unburnts prior to venting of flue gases to the atmosphere. CLC is utilized to oxidize a fuel in a fuel reactor. Fuel oxidation is accomplished by mixing the fuel with an oxygen carrier previously oxidized in an air reactor. The metal oxide may be chemical looping oxygen uncoupling material (CLOU particles) having a specificity to release gaseous oxygen. Oxidation of the fuel in the fuel reactor may leave a portion of the fuel incompletely oxidized, leaving unburnts in a flue gas stream of the fuel reactor. The flue gas stream of the fuel reactor containing unburnts may be transmitted to a post oxidation reactor. The post oxidation reactor may further receive oxidized oxygen carriers from an air reactor, which may be the air reactor of the CLC system or a separate air reactor. An air reactor of the CLC may be increased in capacity to increase output of oxidized oxygen carriers to supply both the fuel reactor and the post oxidation reactor. Unburnts are oxidized by oxygen carriers in the post oxidation reactor and reduced oxygen carriers are separated from a flue gas stream of the post oxidation reactor and returned to an air reactor for re-oxidation. By oxidizing unburnts in a post oxidation reactor, unburnts may be efficiently oxidized without the need for cryogenically produced oxygen, substantially reducing the energy demands for removal of unburnts from a CLC system.

According to an exemplary embodiment of the present disclosure, an efficient method of oxidizing unburnts in a flue gas stream is provided wherein a flue gas stream containing unburnts is transmitted for oxidation in a post oxidation reactor, which is further supplied by oxygen carriers. The oxygen carriers are oxidized in an air reactor.

According to an exemplary embodiment of the present disclosure, an apparatus for oxidation of unburnts in a CLC system is provided, including a post oxidation reactor, an air reactor connected to the post oxidation reactor, and a fuel reactor connected to the post oxidation reactor. A flue gas stream of the fuel reactor, containing unburnts, is configured to transmit to the post oxidation reactor, which further receives oxidized oxygen carriers from the air reactor. The air reactor may also supply oxidized oxygen carriers to the fuel reactor or may be a separate air reactor. If the air reactor is configured to supply both the post oxidation reactor and the fuel reactor, it may be increased in size over that typically contemplated for a CLC system to account for an increased demand on oxidized oxygen carrier production. The apparatus may further include a post-oxidation chamber, preferably a catalytic chamber, configured to receive a portion of the flue gas stream of the fuel reactor directly and a flue gas stream of the post oxidation reactor, wherein oxygen is present in the flue gas stream of the post oxidation reactor. In this configuration, a portion of oxidation of unburnts occurs in the catalytic chamber and portion of oxidation of unburnts occurs in the post oxidation reaction.

Referring to FIG. 1, CLC typically includes an air reactor 14 and a fuel reactor 12, which may be fluidized bed reactors, wherein a fuel 10 is injected into the fuel reactor 12 and wherein the fuel reactor 12 is further injected with an oxygen carrier 22 formed in the air reactor 14. One example of the fuel is coal. Other examples include, but are not limited to, natural gas, synthetic gas (syngas), and petroleum refinery gas. The oxygen carrier particles are typically metallic or ceramic. Typical metal oxides used for CLC include nickel oxide, calcium oxide, iron oxide, copper oxide, manganese oxide, cobalt oxide and mixtures hereof as examples. Some oxygen carriers are so-called CLOU particles as they release oxygen without needing a reaction partner.

Fuel reactor 12 may be fluidized by a fluidization medium such as steam 58. Combustion of fuel 10 in fuel reactor 12 produces a flue gas stream 26. Flue gas stream 26 generally contains uncombusted solids, products of combustion ($CO_2$ and $H_2O$), reduced oxygen carriers, and may also include unburnts, such as carbon monoxide, hydrogen, or methane. Flue gas stream 26 may be transmitted to a first solid separator 28, which may be cyclone separator, wherein solids 48 are separated from flue gas stream 26 and transmitted 28 to the air reactor 14. Solids 48 from first separator 28 may first be transmitted to an optional carbon stripper 50. Reduced oxygen carriers exiting carbon stripper 50 are transmitted 52 to the air reactor 14. Any char exiting carbon stripper 50 is transmitted 54 back to fuel reactor 12. A flue gas stream 30 of the first solid separator 28 may be transmitted to a second solid separator 32, which may be a cyclone separator, wherein additional solids may be removed from flue gas stream 30 and transmitted 56 back to fuel reactor 12.

Flue gas stream 34 of the second solid separator 32, which generally contains the non-solid components from flue gas stream 26 of fuel reactor 12 is transmitted to a post combustion unit 36. The post combustion unit 36 is configured to receive an oxygen stream 38. Oxygen stream 38 may be pure oxygen or oxygen-enriched gas, which is typically created cryogenically at substantial energy and capital costs. Unburnts may be oxidized in post combustion unit 36 and a flue gas stream of post combustion unit 40 may be transmitted to a gas processing unit (GPU) 42 for $CO_2$ capture and processing. $CO_2$ may be further transmitted 46 for storage or use, as applicable. After capture of $CO_2$, the flue gas stream, containing primarily $N_2$, Ar, and unused $O_2$, may be vented 44 to the atmosphere.

In air reactor 14, oxygen carriers are oxidized by air 16 supplied to air reactor 14. A flue gas stream 18 of air reactor 14 may be transmitted a third solid separator 20, which may be a cyclone separator. Third solid separator 20 separates oxidized oxygen carriers from flue gas stream 18 of air reactor 14, allowing the non-reactive components of air and unused oxygen to be vented as off air 24 to the atmosphere. Oxidized oxygen carriers are transmitted 22 to fuel reactor 12 where they may supply oxygen for oxidation of the fuel 10, completing a regenerative cycle for the oxygen carrier.

Figure 2:
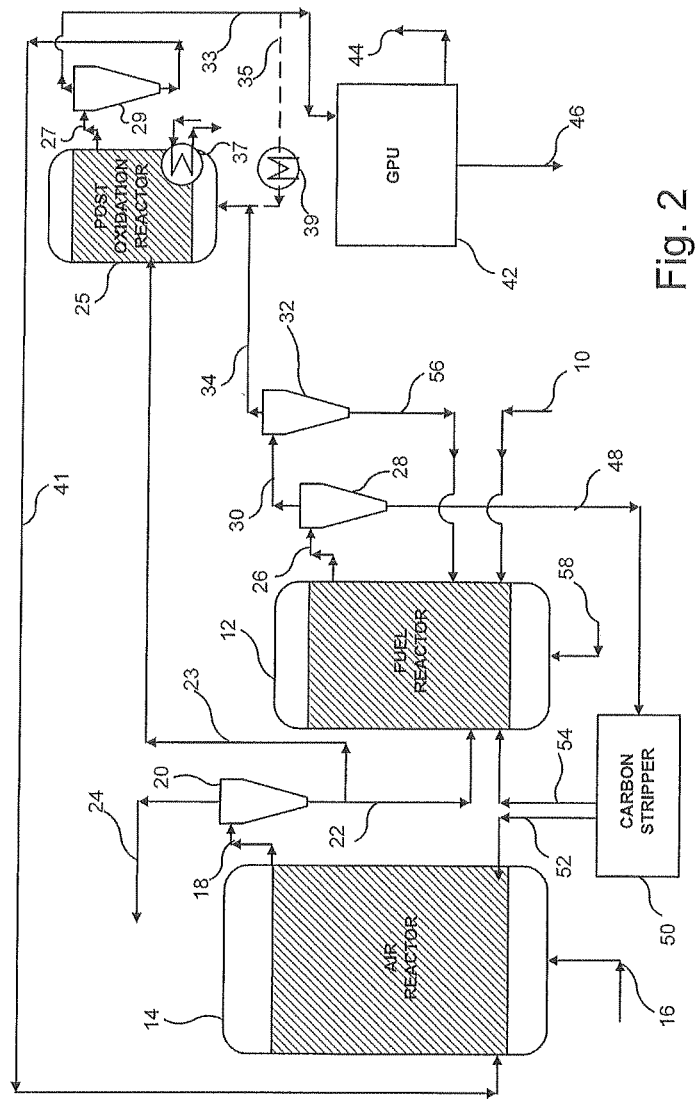
FIG. 2 is a schematic flow diagram of an exemplary embodiment of the present disclosure.

Referring now to the exemplary embodiment shown in FIG. 2, flue gas stream 26 of the fuel reactor 12 may be transmitted to a post oxidation reactor 25, which may be a fluidized bed reactor, facilitating even temperature distribution throughout post oxidation reactor 25 and/or recovery of heat from the post oxidation reactor 25. The post oxidation reactor 25 is further supplied with oxidized oxygen carriers. Flue gas stream 26 may first be transmitted to the first 28 and second 32 solid separators prior to transmission to the post oxidation reactor 25 as shown in FIG. 2, or the post oxidation reactor may be configured to receive flue gas stream 30 from separator 28 or flue gas stream 26 directly if the solids load, especially unburnt solids, is sufficiently low. However, solids from the flue gas stream 26 should be separated before transmitting flue gas stream 26 to post oxidation reactor 25. Employing two separators provides improved operation of the system (e.g. recirculation of carbon/separation in a carbon stripper). For the remainder of this description, the configuration represented in FIG. 2 will be assumed, resulting in flue gas stream 34. As shown in FIG. 2, oxidized oxygen carriers may be transmitted to the post oxidation reactor 25 from a portion 23 of solids separated by the third solid separator 20; however, this represents only one exemplary embodiment of the present disclosure and other configurations are possible, including a separate air reactor to oxidize oxygen carriers, especially CLOU particles, for the post oxidation reactor 25.

Unburnts contained in flue gas stream 34 may be oxidized in the post oxidation reactor 25 via oxygen supplied by oxidized oxygen carriers 23. Flue gas stream 27 of the post oxidation reactor 25 may be transmitted to a fourth solid separator 29, which may be a cyclone separator. The fourth solid separator 29 separates oxygen carriers from flue gas stream 27, which may be transmitted 41 to the air reactor 14 where the oxygen carriers may be re-oxidized. In an alternate embodiment, the oxygen carriers may be transmitted to a separate air reactor. This enables the use of an oxygen carrier different from an oxygen carrier used in the CLC system.

After removal of oxygen carriers in the fourth solid separator 29, flue gas stream 33 may be transmitted to the GPU 42. In an alternative embodiment of the present disclosure, a portion 35 of flue gas stream 33 may be configured to mix with flue gas stream 34 prior to injection into the post oxidation reactor 25. Mixing portion 35 with flue gas stream 34 may be utilized to control temperatures of flue gas stream 27 to prevent sintering of oxygen carriers, keeping temperatures typically below 1100° C. Portion 35 may be first cooled via heat exchanger 39 prior to mixing with flue gas stream 34 allowing for more accurate control of temperatures. In a further alternative, the post oxidation reactor 25 may be directly cooled via heat exchanger 37 which may be utilized to generate steam.

Figure 3:
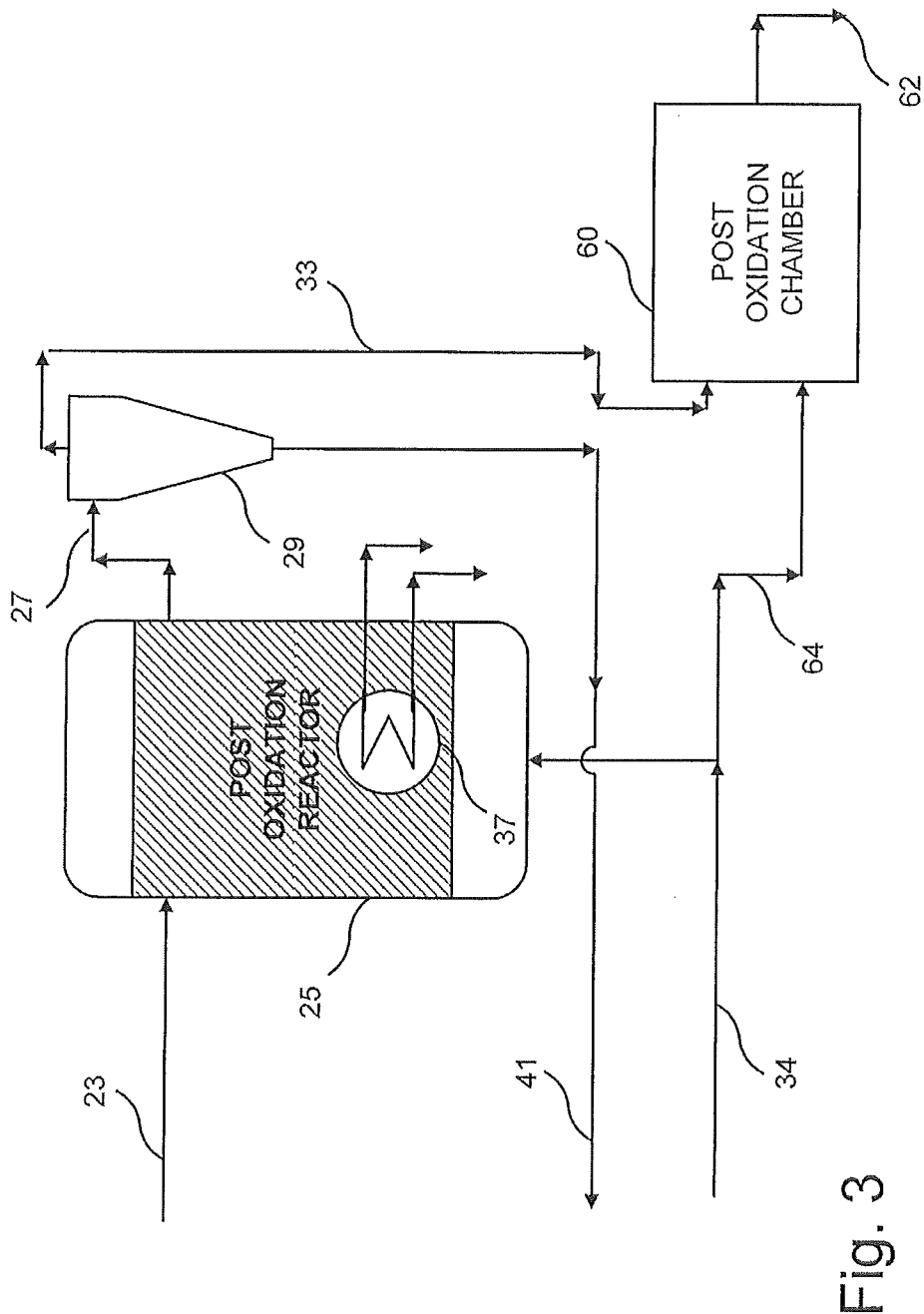
FIG. 3 is a schematic flow diagram of another exemplary embodiment of the present disclosure.

Referring now to the exemplary embodiment shown in FIG. 3, a portion 64 of flue gas stream 34 may be oxidized in a post oxidation chamber 60, which may be catalytic or non-catalytic. Post oxidation chamber 60 is supplied by oxygen in flue gas stream 33 of the fourth solid separator 29 after removal of solids contained in flue gas stream 27 of the post oxidation reactor 25. In this alternative embodiment, CLOU particles, such as $CuO/Cu_2O$, may be utilized as oxygen carriers. A certain fraction of flue gas 34 is deviated towards the post oxidation reactor 25. In the post oxidation reactor 25, unburnts react with $O_2$ released by CLOU particles. An advantage of CLOU particles is that they readily provide oxygen as is defined by chemical equilibrium. The equilibrium partial pressure of oxygen depends on the reactor temperature. Hence $O_2$ concentration of flue gas stream 27 is directly determined by the temperature of post oxidation reactor 25. This $O_2$ enriched flue gas stream 27 is free of unburnts, which were oxidized in the post oxidation reactor 25. Flue gas stream 27 after separating out solids in the fourth solid separator 29, may then be transmitted 33 to post oxidation chamber 60, which may further receive portion 64 of flue gas stream 34 which bypassed post oxidation reactor 25. In post oxidation chamber 60, $O_2$ from the post oxidation reactor 25 oxidizes the unburnts. After oxidation in post oxidation chamber 60, the flue gas stream may be transmitted 62 to the GPU 42 for further processing as indicated on FIG. 2.

By transmitting a flue gas stream of a fuel reactor of CLC technology to a post oxidation reactor further supplied by oxygen carriers instead of pure or enriched oxygen gas, the present disclosure provides an efficient method for the oxidation of unburnts. In one aspect, the present disclosure utilizes an air reactor of the CLC to provide oxygen carriers for oxidation of the unburnts. In another aspect, the present disclosure utilizes a separate air reactor to supply oxygen carriers to the post combustion reactor so two separate oxygen carrier looping cycles may be implemented. In a further aspect, the flue gas stream from the fuel reactor of the CLC system is transmitted in part to the post oxidation reactor (containing oxygen carriers) and in part to a post oxidation chamber, utilizing the oxygen released in the post oxidation reactor for further oxidation of unburnts. If the post oxidation chamber is a catalytic chamber, a nearly complete oxidation of unburnts can be achieved in the absence of excess oxygen.

Although the Figures show a CLC system employing the present disclosure, the present disclosure may be employed to oxidize unburnts in any flue gas stream where oxidation of the unburnts is preferably carried out in oxygen enriched environments. For example, unburnts in a flue gas stream of an oxy-fired plant may be oxidized according to the present disclosure.

Thus, aspects of the present disclosure provide an efficient process for the treatment of unburnts by reducing the capital and energy requirements of pure or oxygen-enriched gas generation typically required for oxidation of the unburnts, thus increasing efficiency of $CO_2$ capture, or by recovering the heat released from the oxidation of the unburnts.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teaching of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of oxidizing unburnts in a chemical looping combustion system, comprising:
    injecting a fuel into a fuel reactor of a chemical looping combustion system;
    injecting oxidized oxygen carriers into the fuel reactor;
    oxidizing the fuel with oxygen provided by the oxygen carriers;
    removing solids from a flue gas stream of the fuel reactor;
    transmitting the flue gas stream of the fuel reactor containing unburnts to a post oxidation reactor;
    injecting oxidized oxygen carriers into the post oxidation reactor;

oxidizing unburnts in the post oxidation reactor with oxygen provided by the oxygen carriers to provide reduced oxygen carriers;

transmitting the reduced oxygen carriers to an air reactor;

oxidizing the reduced oxygen carriers in the presence of air injected in the air reactor to provide oxidized oxygen carriers.

2. The method of claim 1, further comprising separating reduced oxygen carriers from a flue gas stream of the post oxidation reactor.

3. The method of claim 2, further comprising:

separating a first portion of oxidized oxygen carriers and a second portion of oxidized oxygen carriers from a flue gas stream of the air reactor; and transmitting the first portion of oxidized oxygen carriers to the post oxidation reactor and the second portion of oxidized oxygen carriers to the fuel reactor.

4. The method of claim 3, further comprising transmitting a portion of the flue gas stream of the post oxidation reactor, after separating out the reduced oxygen carriers, back to the post oxidation reactor.

5. The method of claim 4, wherein the portion of the flue gas stream of the post oxidation reactor is cooled prior to recirculation to the post oxidation reactor.

6. The method of claim 2, further comprising transmitting the flue gas stream of the post oxidation reactor, after separating out the reduced oxygen carriers, to a gas processing unit.

7. The method of claim 1, further comprising directly cooling the post oxidation reactor.

8. The method of claim 1, wherein the oxygen carriers are metal oxides.

9. The method of claim 1, wherein the oxygen carriers are chemical looping oxygen uncoupling particles.

10. The method of claim 9, further comprising transmitting a portion of the flue gas stream of the fuel reactor to a post oxidation chamber.

11. The method of claim 10, wherein the post oxidation chamber is a catalytic chamber.

12. The method of claim 10, further comprising transmitting the flue gas stream of the post oxidation reactor first to the post oxidation chamber.

13. The method of claim 12, wherein unburnts present in the portion of the flue gas stream of the fuel reactor transmitted to the post oxidation chamber are oxidized by oxygen present in the flue gas stream of the post oxidation reactor.

14. An apparatus for oxidation of unburnts, comprising:

a fuel reactor that receives oxidized oxygen carriers and fuel wherein the fuel is oxidized with oxygen provided by the oxygen carriers;

a first solids separator to remove solids from a flue gas stream of the fuel reactor;

an air reactor that receives reduced oxygen carriers and air wherein the reduced oxygen carriers are oxidized to produce the oxidized oxygen carriers;

a second solids separator to remove the oxidized oxygen carriers from the flue gas stream of the air reactor, wherein the oxidized oxygen carriers are provided to the fuel reactor;

a post oxidation reactor that receives the flue gas stream of the fuel reactor containing unburnts and oxidized oxygen carriers from the second solids separator; and a third solids separator to remove the reduced oxygen carriers from a flue gas stream of the post oxidation reactor.

15. The apparatus of claim 14, further comprising a post oxidation chamber connected to the flue gas stream and the post oxidation reactor such that a portion of the flue gas stream transmits directly to the post oxidation chamber and the flue gas stream of the post oxidation reactor transmits to the post oxidation chamber.

16. The apparatus of claim 15, wherein the post oxidation chamber is catalytic.

17. The apparatus of claim 14, further comprising a heat exchanger to cool the portion of the flue gas stream of the post oxidation reactor prior to recirculation to the post oxidation reactor.

18. The apparatus of claim 14, further comprising a heat exchanger directly cooling the post oxidation reactor.

19. The apparatus of claim 14, wherein the oxygen carriers are metal oxides.

* * * * *